United States Patent
Nitta et al.

(10) Patent No.: US 10,886,531 B2
(45) Date of Patent: Jan. 5, 2021

(54) NEGATIVE ELECTRODE COMPOSITION FOR ELECTRIC STORAGE DEVICE, NEGATIVE ELECTRODE INCLUDING THE COMPOSITION, ELECTRIC STORAGE DEVICE, AND METHOD FOR PRODUCING NEGATIVE ELECTRODE FOR ELECTRIC STORAGE DEVICE

(71) Applicants: Sumitomo Electric Industries, Ltd., Osaka (JP); Nippon Soda Co., Ltd., Tokyo (JP)

(72) Inventors: Koji Nitta, Osaka (JP); Shoichiro Sakai, Osaka (JP); Atsushi Fukunaga, Osaka (JP); Eiko Imazaki, Osaka (JP); Koma Numata, Osaka (JP); Hideaki Ito, Joetsu (JP); Hitoshi Kobayashi, Joetsu (JP); Toshiaki Yamashita, Joetsu (JP); Shinichi Maruyama, Joetsu (JP)

(73) Assignees: Sumitomo Electric Industries, Ltd., Osaka (JP); Nippon Soda Co., Ltd., Tokyo (JP)

( * ) Notice: Subject to any disclaimer, the term of this patent is extended or adjusted under 35 U.S.C. 154(b) by 35 days.

(21) Appl. No.: 15/526,707

(22) PCT Filed: Nov. 12, 2015

(86) PCT No.: PCT/JP2015/081834
§ 371 (c)(1),
(2) Date: May 12, 2017

(87) PCT Pub. No.: WO2016/076387
PCT Pub. Date: May 19, 2016

(65) Prior Publication Data

US 2017/0324086 A1    Nov. 9, 2017
US 2018/0151877 A2    May 31, 2018
US 2019/0027744 A2    Jan. 24, 2019

(30) Foreign Application Priority Data

Nov. 13, 2014    (JP) .................................. 2014-230862

(51) Int. Cl.
*H01M 4/00* (2006.01)
*H01M 4/38* (2006.01)
(Continued)

(52) U.S. Cl.
CPC ............ *H01M 4/381* (2013.01); *H01G 11/04* (2013.01); *H01G 11/30* (2013.01); *H01G 11/62* (2013.01);
(Continued)

(58) Field of Classification Search
CPC ............. H01M 4/381; H01M 10/0566; H01M 4/1395; H01M 4/134; H01M 4/0459;
(Continued)

(56) References Cited

U.S. PATENT DOCUMENTS

2002/0119373 A1    8/2002   Gao et al.
2012/0171574 A1*   7/2012   Zhamu ................... H01M 4/13
                                                             429/300
(Continued)

FOREIGN PATENT DOCUMENTS

CN    1830110 A    9/2006
CN    1290209 C    12/2006
(Continued)

OTHER PUBLICATIONS

Machine translation of WO 2011/037250 which corresponds to JP 2012-69894 cited in the IDS, obtained Oct. 6, 2018 (Year: 2011).*
(Continued)

*Primary Examiner* — Nicholas P D'Aniello
(74) *Attorney, Agent, or Firm* — Baker Botts L.L.P.; Michael A. Sartori (57) ABSTRACT

Provided is a method for producing a negative electrode for an electric storage device, the method comprising the steps
(Continued)

of preparing a negative electrode composition comprising a negative electrode active material that reversibly carries a sodium ion, metal sodium, and a liquid dispersion medium for dispersing them; allowing a negative electrode current collector to hold the negative electrode composition; evaporating at least part of the liquid dispersion medium from the negative electrode composition held by the negative electrode current collector, thereby giving a negative electrode precursor comprising the negative electrode active material, the metal sodium, and the negative electrode current collector; and bringing the negative electrode precursor into contact with an electrolyte having sodium ion conductivity, thereby doping the negative electrode active material with sodium eluted from the metal sodium.

8 Claims, 1 Drawing Sheet (51) Int. Cl.
    *H01G 11/62* (2013.01)
    *H01G 11/30* (2013.01)
    *H01G 11/86* (2013.01)
    *H01M 10/054* (2010.01)
    *H01G 11/04* (2013.01)
    *H01M 4/04* (2006.01)
    *H01M 4/36* (2006.01)
    *H01M 4/134* (2010.01)
    *H01M 10/0566* (2010.01)
    *H01M 4/1395* (2010.01)
    *H01M 10/0564* (2010.01)

(52) U.S. Cl.
    CPC .......... *H01G 11/86* (2013.01); *H01M 4/0459* (2013.01); *H01M 4/134* (2013.01); *H01M 4/1395* (2013.01); *H01M 4/362* (2013.01); *H01M 10/054* (2013.01); *H01M 10/0564* (2013.01); *H01M 10/0566* (2013.01); *Y02E 60/13* (2013.01)

(58) Field of Classification Search
    CPC ............. H01M 4/362; H01M 10/0564; H01M 10/054; H01G 11/86; H01G 11/62; H01G 11/30; H01G 11/04; Y02E 60/13
    See application file for complete search history.

(56) References Cited

U.S. PATENT DOCUMENTS

| | | | |
|---|---|---|---|
| 2013/0284988 A1* | 10/2013 | Satake | H01G 11/06 252/518.1 |
| 2013/0288153 A1* | 10/2013 | Yang | H01M 8/1004 429/482 |
| 2014/0017574 A1* | 1/2014 | Ito | H01M 4/366 429/332 |
| 2015/0295279 A1 | 10/2015 | Numata et al. | |

FOREIGN PATENT DOCUMENTS

| | | |
|---|---|---|
| CN | 103119758 A | 5/2013 |
| EP | 2 605 316 A1 | 6/2013 |
| JP | H03-263768 A | 11/1991 |
| JP | 2011-009202 A | 1/2011 |
| JP | 2012-069894 A | 4/2012 |
| JP | 2012-169160 A | 9/2012 |
| JP | 2013-084522 A | 5/2013 |
| JP | 2013-109938 A | 6/2013 |
| JP | 2014-107141 A | 6/2014 |
| JP | 2015-153584 A | 8/2015 |
| WO | 2005/013397 A1 | 2/2005 |
| WO | 2014/170979 A1 | 10/2014 |

OTHER PUBLICATIONS

Machine translation of WO-2011037250—Sodium-Ion-Type Power Storage Device, obtained Nov. 27, 2018 (Year: 2011).*
C.R. Jarvis, et al., "A lithium ion cell containing a non-lithiated cathode," Journal of Power Sources, 146 (2005) pp. 331-334, [Cited in OA in corr CN Pat. Appl. No. 201580060800.5., dated of Mar. 20, 2020].

* cited by examiner

NEGATIVE ELECTRODE COMPOSITION FOR ELECTRIC STORAGE DEVICE, NEGATIVE ELECTRODE INCLUDING THE COMPOSITION, ELECTRIC STORAGE DEVICE, AND METHOD FOR PRODUCING NEGATIVE ELECTRODE FOR ELECTRIC STORAGE DEVICE

TECHNICAL FIELD

The present invention relates to an electric storage device utilizing a faradaic reaction of a sodium ion, and particularly relates to improvement in a negative electrode composition for use in producing a negative electrode for an electric storage device.

BACKGROUND ART

In recent years, attention has been directed to techniques for converting natural energy, such as solar light or wind power, into electric energy. Further, there is a growing demand for an electric storage device that can storage much electric energy, such as a lithium ion secondary battery and a lithium ion capacitor. However, the prices of lithium resources have also increased due to the growing market of such electric storage devices.

For this reason, a electric storage device including a sodium ion as a carrier ion have been studied. Patent Literature 1 discloses a sodium ion capacitor including a polarizable positive electrode and a negative electrode including hard carbon or the like in combination. In Patent Literature 1, a negative electrode active material is pre-doped with a sodium ion from the viewpoint of enhancing a discharge capacity or a cycle characteristic.

The pre-doping of a negative electrode active material with a sodium ion is performed by putting a metal sodium foil in the electric storage device and bringing the negative electrode and the metal sodium foil into contact with an electrolyte inside the electric storage device to allow the negative electrode to occlude a sodium ion eluted from the metal sodium foil into the electrolyte.

CITATION LIST

Patent Literature

Patent Literature 1: Japanese Unexamined Patent Publication No. 2012-69894

SUMMARY OF INVENTION

Technical Problem

However, since the metal sodium foil is usually localized in one area in the electric storage device, it difficult to allow the pre-doping to uniformly and quickly proceed.

It is therefore an object of the present invention to provide means for uniformly and quickly pre-doping with sodium a negative electrode active material for an electric storage device, the negative electrode active material carrying reversibly a sodium ion.

Solution to Problem

One aspect of the present invention relates to a negative electrode composition for an electric storage device including: a negative electrode active material that reversibly carries a sodium ion; and metal sodium.

Another aspect of the present invention relates to a negative electrode for an electric storage device having: the above-described negative electrode composition; and a negative electrode current collector for holding the negative electrode composition.

Yet another aspect of the present invention relates to an electric storage device including: the above-described negative electrode; a positive electrode including a positive electrode active material; a separator interposed between the negative electrode and the positive electrode; and an electrolyte having sodium ion conductivity.

Yet another aspect of the present invention relates to a method for producing a negative electrode for an electric storage device, the method including the steps of: preparing a negative electrode composition including a negative electrode active material that reversibly carries a sodium ion, metal sodium, and a liquid dispersion medium for dispersing the negative electrode active material and the metal sodium; allowing a negative electrode current collector to hold the negative electrode composition; evaporating at least part of the liquid dispersion medium from the negative electrode composition held by the negative electrode current collector, thereby giving a negative electrode precursor having the negative electrode active material, the metal sodium, and the negative electrode current collector; and bringing the negative electrode precursor into contact with an electrolyte having sodium ion conductivity to ionize the metal sodium, thereby doping the negative electrode active material with sodium.

Advantageous Effects of Invention

According to the above aspects of the present invention, it is possible to uniformly and quickly pre-dope with sodium a negative electrode active material for an electric storage device, the negative electrode active material carrying reversibly a sodium ion.

DESCRIPTION OF EMBODIMENTS

Description of Embodiments of Invention

First, embodiments of the present invention listed below will be described.

A negative electrode composition for an electric storage device according to one embodiment of the present invention includes: a negative electrode active material that reversibly carries a sodium ion; and metal sodium.

The negative electrode composition including metal sodium constitutes a negative electrode active material layer precursor of a negative electrode having a negative electrode active material layer and a negative electrode current collector. The negative electrode active material is doped with a sodium ion eluted from the metal sodium so that a negative electrode is formed from the precursor.

In the negative electrode composition, it is preferable that at least part of the negative electrode active material and at least part of the metal sodium are mixed. That is, it is preferable that the negative electrode composition is a mixture including at least a negative electrode active material and metal sodium. The negative electrode composition can be a negative electrode slurry further containing a liquid dispersion medium for dispersing the negative electrode active material and the metal sodium. That is, the term "negative electrode composition" is used as a concept encompassing a negative electrode slurry before being held by a negative electrode current collector, and a negative electrode mixture layer held by a negative electrode current collector.

Inside the negative electrode active material layer precursor, the metal sodium is present in the form of, for example, a particle. Therefore, most of the negative electrode active material in the layer is close to the metal sodium. As a result, it possible to uniformly and quickly dope the negative electrode active material with sodium. In the negative electrode composition, part of the sodium mixed with the negative electrode active material can be ionized to be occluded in the negative electrode active material.

It is preferable that the negative electrode composition contains the metal sodium in an amount corresponding to 10 to 200% of an irreversible capacity of the negative electrode active material. This makes it possible to suppress a reduction in the capacity of an electric storage device caused by the irreversible capacity of the negative electrode active material.

It is preferable that the metal sodium particle preferably has an average particle diameter D of 10 to 60 μm. This allows quick elution (ionization) of sodium from the metal sodium. Further, since adequate contact between particles of the negative electrode active material is maintained after the metal sodium is completely dissolved, a strength of a negative electrode active material layer is easily maintained.

When the doping of the negative electrode active material with sodium in the metal sodium is completed, the negative electrode composition constitutes a negative electrode active material layer. The negative electrode composition, in which the negative electrode active material is doped with part of sodium in the metal sodium, constitutes an intermediate between the negative electrode active material layer precursor and the negative electrode active material layer. However, the negative electrode composition, in which the negative electrode active material is doped with at least part of sodium in the metal sodium, is herein regarded to constitute a negative electrode active material layer.

A negative electrode for an electric storage device according to another embodiment of the present invention includes: the above-described negative electrode composition constituting a negative electrode active material layer; and a negative electrode current collector for holding the negative electrode composition. Since the above-described negative electrode is uniformly doped with sodium, the above-described negative electrode is excellent in a capacitance characteristic from the initial stage of charge and discharge.

An electric storage device according to yet another embodiment of the present invention includes: the above-described negative electrode; a positive electrode including a positive electrode active material; a separator interposed between the negative electrode and the positive electrode; and an electrolyte having sodium ion conductivity. It is preferable that the electrolyte contains an ionic liquid.

The term "ionic liquid" refers to an ionic liquid material composed of an anion and a cation. A salt in a molten state can be referred to as an ionic liquid.

When an ionic liquid is used for the electrolyte, the amount of the ionic liquid contained in the electrolyte is preferably 80 mass % or more, more preferably 90 mass % or more, particularly preferably 98 mass % or more. When the amount of the ionic liquid contained in the electrolyte is within the above range, it is easy to enhance the heat resistance and/or flame resistance of the electrolyte.

Since the ionic liquid is highly stable toward the metal sodium, the ionic liquid makes it possible to minimize a side reaction with the metal sodium. Therefore, pre-doping can be more efficiently performed as compared to a case where an electrolyte mainly containing an organic solvent (organic electrolyte) is used.

For the above reason, the above-described negative electrode is suitable for an electric storage device including an ionic liquid as an electrolyte (hereinafter, referred to as an ionic liquid-type electric storage device). Examples of the ionic liquid-type electric storage device include a sodium ion battery and a sodium ion capacitor, each containing, as an electrolyte, an ionic liquid containing a sodium ion. However, the above-described negative electrode can be applied not only to such an ionic liquid-type electric storage device but also to a sodium battery or a sodium ion capacitor, the sodium battery or sodium ion capacitor containing an organic electrolyte.

A method for producing a negative electrode for an electric storage device according to yet another embodiment of the present invention includes the steps of; preparing a negative electrode composition (first step); allowing a negative electrode current collector to hold the negative electrode composition (second step); then giving a negative electrode precursor (third step); and doping with sodium a negative electrode active material of the negative electrode precursor (fourth step).

In the first step, a negative electrode composition including a negative electrode active material that reversibly carries a sodium ion, metal sodium, and a liquid dispersion medium for dispersing them is prepared. In the third step, at least part of the liquid dispersion medium is evaporated from the negative electrode composition held by the negative electrode current collector, thereby forming a negative electrode precursor including the negative electrode active material, the metal sodium, and the negative electrode current collector. In the fourth step, the negative electrode precursor is brought into contact with an electrolyte having sodium ion conductivity, thereby doping the negative electrode active material with sodium eluted from the metal sodium.

The negative electrode precursor includes a negative electrode active material layer precursor. A negative electrode is formed from the negative electrode precursor through the fourth step (pre-doping with sodium). The above-described method allows the negative electrode active material layer precursor itself to contain metal sodium. This makes it possible to incorporate the step of introducing metal sodium for pre-doping into an electric storage device into the process of producing a negative electrode. Therefore, a step of separately putting a metal sodium foil inside an electric storage device is not required.

In the fourth step, in order to enhance the contact efficiency between the negative electrode precursor and the electrolyte, it is preferable to use the negative electrode precursor containing no liquid dispersion medium or the negative electrode precursor containing a minute amount of the remaining liquid dispersion medium that is to be replaced with the electrolyte.

Details of Embodiments of Invention

Hereinbelow, the embodiments of the present invention will be described with reference to the drawings. The present invention is not limited to the following embodiments but is defined by the appended claims, and equivalents to the claims and all modifications within the scope of the claims are intended to be embraced by the claims.

(Negative Electrode Composition)

First, the negative electrode composition as a negative electrode active material layer precursor will be described.

The negative electrode composition includes: a negative electrode active material that reversibly carries a sodium ion; and metal sodium. The negative electrode composition can further include, as an optional component, a binder, a conductive auxiliary agent, a liquid dispersion medium (first dispersion medium), or the like.

The negative electrode composition is prepared by, for example, adding metal sodium and an optional component to an appropriate dispersion medium and mixing them. At this time, the preparation of the negative electrode composition can be performed by adding both metal sodium and an optional component to a dispersion medium, or by preparing a dispersion of metal sodium and a solution or dispersion containing an optional component separately from each other and then mixing both of them.

The dispersion of metal sodium can be obtained by putting solid metal sodium pieces having surfaces with metallic luster in a dispersion medium and then heating the resulting mixture to a temperature equal to or higher than the melting point of sodium (97.8° C.) with stirring. Alternatively, previously-molten metal sodium can be added to a dispersion medium with stirring. This makes it possible to uniformly disperse the metal sodium (e.g., particulate metal sodium) in the dispersion medium while suppressing the generation of an oxide or the like. A method for mixing the metal sodium and the dispersion medium is not particularly limited. In the mixing of the metal sodium and the dispersion medium, there can be used a disperser such as a homogenizer, a ball mill, a sand mill, or a planetary mixer.

It is preferable that an impurity, such as moisture, be removed from the dispersion medium and another optional component before mixing with the metal sodium. For example, when a solution or dispersion containing an optional component such as a binder and a dispersion of metal sodium are mixed together, it is preferable that a dehydration reaction is performed previously by separately adding a small amount of metal sodium to the solution or dispersion containing an optional component.

The dispersion medium for dispersing the metal sodium is not particularly limited as long as it is a liquid medium that does not react with the metal sodium. Such a liquid medium is preferably a hydrocarbon-based solvent. Examples of the liquid medium include a paraffin-based hydrocarbon having 6 to 20 carbon atoms and having flowability, an aromatic hydrocarbon such as toluene or xylene, an animal or plant oil such as coconut oil or castor oil, a synthetic oil such as silicone oil, and the like. The paraffin-based hydrocarbon can be linear normal paraffin or branched isoparaffin. Among these paraffin-based hydrocarbons, normal paraffin is more preferred. These dispersion media can be used alone or used in admixture of two or more of them.

The content of the metal sodium in the dispersion of metal sodium can be, for example, 1 to 15 mass %, but is preferably 10 to 15 mass %.

The metal sodium is preferably particulate. When the metal sodium is particulate, the shape of its particles is not particularly limited. The particles can have any shape such as a spherical, rod-like, needle-like, plate-like, columnar, indefinite, scale-like, or spindle-like shape. Alternatively, the metal sodium can be in a molten state (i.e., liquid) or in the form of clusters composed of a few sodium atoms. When the metal sodium is in a molten state, the metal sodium shall be present in the dispersion of metal sodium so as to be distinguishable from the dispersion medium.

In the negative electrode composition, the average particle diameter D of the metal sodium is not particularly limited, but is preferably 10 to 60 μm, more preferably 10 to 55 μm, particularly preferably 10 to 50 μm. When the average particle diameter D of the metal sodium is within the above range, the metal sodium is further easily handled, and pre-doping is likely to quickly proceed. The average particle diameter means a median value in a volume-based particle size distribution. The particle size distribution is measured by a laser diffraction particle size distribution analyzer. The same applies hereinafter.

The negative electrode composition can be, for example, a mixture of a dispersion of sodium metal, a negative electrode active material, and an optional component used as necessary. In this case, it is preferable that the negative electrode composition contains the metal sodium in an amount corresponding to 10 to 200%, more preferably 50 to 150% of the irreversible capacity of the negative electrode active material.

Further, when a positive electrode active material of an electric storage device has an irreversible capacity, additional metal sodium can be added to the negative electrode composition. Further, when a synthesized positive electrode active material has a composition poor in Na, metal sodium can be added to the negative electrode composition to cover a shortfall (e.g., in an amount corresponding to 10 to 67% of the capacity of a positive electrode).

Examples of the negative electrode active material that reversibly carries a sodium ion include hard carbon (non-graphitizable carbon), a sodium-containing titanium oxide, a lithium-containing titanium oxide, and the like. The sodium-containing titanium oxide and the lithium-containing titanium oxide each have a spinel-type crystal structure.

The hard carbon is different from graphite having a graphite-type crystal structure, in which carbon layer planes are stacked in layers, in that the hard carbon has a turbostratic structure in which carbon layer planes are stacked to be three-dimensionally misaligned. Even when the hard carbon is subjected to heat treatment at a high temperature (e.g., at 3000° C.), conversion from the turbostratic structure to the graphite structure does not occur and graphite crystallites do not grow. For this reason, the hard carbon is also referred to as non-graphitizable carbon.

As an indicator of the degree of growth of a graphite-type crystal structure in a carbonaceous material, an average interplanar spacing $d_{002}$ between (002) planes of the carbonaceous material measured from an X-ray diffraction (XRD) spectrum is used. A carbonaceous material classified as graphite generally has an average interplanar spacing $d_{002}$ as small as less than 0.337 nm, but the hard carbon having a turbostratic structure has a large average interplanar spacing $d_{002}$. The average interplanar spacing $d_{002}$ of the hard carbon is, for example, 0.37 nm or more, preferably 0.38 nm or more. The upper limit of the average interplanar spacing $d_{002}$ of the hard carbon is not particularly limited. The average interplanar spacing $d_{002}$ of the hard carbon can be, for example, 0.42 nm or less. The average interplanar spacing $d_{002}$ of the hard carbon can be, for example, 0.37 to 0.42 nm, preferably 0.38 to 0.4 nm.

The hard carbon has a turbostratic structure. The proportion of a graphite-type crystal structure in the hard carbon is low. When a sodium ion is occluded in the hard carbon, the sodium ion enters the turbostratic structure (more specifically, portions other than portions between layers of the graphite-type crystal structure) of the hard carbon or are adsorbed to the hard carbon to be occluded in the hard carbon. The portions other than portions between layers of the graphite-type crystal structure include, for example, voids (or pores) formed in the turbostratic structure.

Since the hard carbon has such voids (or pores) as described above, the hard carbon has a lower average specific gravity than graphite having a crystal structure in which carbon layer planes are densely stacked in layers. The average specific gravity of the hard carbon is, for example, 1.7 g/cm$^3$ or less, preferably 1.4 to 1.7 g/cm$^3$, more preferably 1.5 to 1.7 g/cm$^3$. When the hard carbon has such an average specific gravity, a volume change caused by occlusion and release of a sodium ion during charge and discharge can be made small, which effectively suppresses deterioration of the active material.

The average particle diameter (particle diameter at a cumulative volume of 50% in a volume particle size distribution) of the hard carbon is, for example, 3 to 20 μm, preferably 5 to 15 μm. When the average particle diameter is within such a range, pre-doping with sodium is likely to quickly proceed, and the filling property of the negative electrode active material in a negative electrode is easily improved.

An example of the hard carbon includes a carbonaceous material obtained by carbonizing a raw material that is carbonized in a solid state. The raw material that is carbonized in a solid state is a solid organic substance. Specific examples of such a solid organic substance include saccharides, resins (e.g., thermosetting resins such as phenol resins and thermoplastic resins such as polyvinylidene chloride), and the like. Examples of the saccharides include a saccharide having a relatively short sugar chain (monosaccharides or oligosaccharides such as sugar) and a polysaccharide such as cellulose (e.g., cellulose or derivatives thereof (e.g., cellulose esters and cellulose ethers) and materials containing cellulose such as wood and fruit shells (e.g., coconut shells)). The hard carbon includes also glassy carbon. These hard carbons can be used alone or used in admixture of two or more of them.

Among the sodium-containing titanium oxides, sodium titanate is preferred. More specifically, it is preferable that at least one selected from the group consisting of $Na_2Ti_3O_7$ and $Na_4Ti_5O_{12}$ is used. The sodium titanate can contain at least one of another atom or ion replaced with part of Ti or Na in its crystal structure and a lattice defect. The sodium-containing titanium oxide to be used can be, for example, $Na_{2-x}M^1_xTi_{3-y}M^2_yO_7$ ($0 \leq x \leq 3/2$, $0 \leq y \leq 8/3$, and $M^1$ and $M^2$ are each independently a metal element (atom or ion) other than Na and Ti, for example, at least one selected from the group consisting of Ni, Co, Mn, Fe, Al, and Cr), $Na_{4-x}M^3_xTi_{5-y}M^4_yO_{12}$ ($0 \leq x \leq 11/3$, $0 \leq y \leq 14/3$, and $M^3$ and $M^4$ are each independently a metal element (atom or ion) other than Na and Ti, for example, at least one selected from the group consisting of Ni, Co, Mn, Fe, Al, and Cr), or the like. These sodium-containing titanium compounds can be used alone or used in admixture of two or more of them. The $M^1$ and $M^3$ are elements (atoms or ions) that occupy the Na site in the crystal structure. Further, the $M^2$ and $M^4$ are elements (atoms or ions) that occupy the Ti site in the crystal structure.

Among the lithium-containing titanium compounds, lithium titanate is preferred. More specifically, it is preferable that at least one selected from the group consisting of $Li_2Ti_3O_7$ and $Li_4Ti_5O_{12}$ is used. The lithium titanate can contain at least one of another atom or ion replaced with part of Ti or Li in its crystal structure and a lattice defect. The lithium-containing titanium compound to be used can be, for example, $Li_{2-x}M^5_xTi_{3-y}M^6_yO_7$ ($0 \leq x \leq 3/2$, $0 \leq y \leq 8/3$, and $M^5$ and $M^6$ are each independently a metal element (atom or ion) other than Li and Ti, for example, at least one selected from the group consisting of Ni, Co, Mn, Fe, Al, and Cr), $Li_{4-x}M^7_xTi_{5-y}M^8_yO_{12}$ ($0 \leq x \leq 11/3$, $0 \leq y \leq 14/3$, and $M^7$ and $M^8$ are each independently a metal element (atom or ion) other than Li and Ti, for example, at least one selected from the group consisting of Ni, Co, Mn, Fe, Al, and Cr), or the like. These lithium-containing titanium compounds can be used alone or used in admixture of two or more of them. The $M^5$ and $M^7$ are elements (atoms or ions) that occupy the Li site in the crystal structure. Further, $M^6$ and $M^8$ are elements (atoms or ions) that occupy the Ti site in the crystal structure.

The sodium-containing titanium compound and the lithium-containing titanium compound are each usually particulate. In this case, the average particle diameter (particle diameter at a cumulative volume of 50% in a volume particle size distribution) of each of the sodium-containing titanium compound and the lithium-containing titanium compound is, for example, 3 to 20 μm, preferably 5 to 15 μm. When the average particle diameter is within such a range, pre-doping with sodium is likely to quickly proceed, and the filling property of the negative electrode active material in a negative electrode is easily improved.

The binder plays a role in binding particles of the negative electrode active material together and fixing the negative electrode active material to a current collector. Examples of the binder include: a fluorocarbon resin such as polytetrafluoroethylene, a tetrafluoroethylene-hexafluoropropylene copolymer, or polyvinylidene fluoride; a polyamide resin such as an aromatic polyamide; a polyimide resin such as a polyimide (e.g., an aromatic polyimide) or a polyamideimide; styrene rubber such as styrene-butadiene rubber (SBR); a rubbery polymer such as butadiene rubber; a cellulose derivative (e.g., a cellulose ether) such as carboxymethyl cellulose (CMC) or a salt (e.g., a Na salt) thereof, and the like. The amount of the binder is preferably 1 to 10 parts by mass, more preferably 3 to 5 parts by mass per 100 parts by mass of the negative electrode active material.

Examples of the conductive auxiliary agent include: a carbonaceous conductive auxiliary agent such as carbon black or carbon fiber; and metal fiber. The amount of the conductive auxiliary agent can be appropriately selected from the range of, for example, 0.1 to 15 parts by mass, and can be 0.3 to 10 parts by mass per 100 parts by mass of the active material.

(Negative Electrode)

A negative electrode precursor can be obtained by fixing the negative electrode composition to the surface of a negative electrode current collector. The negative electrode precursor can be formed by, for example, applying a negative electrode slurry as the negative electrode composition to the surface of a negative electrode current collector, drying the negative electrode slurry, and, if necessary, rolling the negative electrode current collector having the negative electrode composition.

The negative electrode slurry can be prepared by, for example, mixing a negative electrode active material, metal sodium, and a liquid dispersion medium (e.g., a second dispersion medium) for dispersing them (first step). The negative electrode composition further contains, for example, a second dispersion medium, a binder, a conductive auxiliary agent, or the like in addition to the negative electrode active material and the metal sodium. The second dispersion medium is used to adjust the solid content of the negative electrode slurry to a level within a range suitable for application.

Examples of the second dispersion medium include, but are not particularly limited to a ketone such as acetone; an ether such as tetrahydrofuran; a nitrile such as acetonitrile; an amide such as dimethylacetamide; N-methyl-2-pyrrolidone, and the like. These second dispersion media can be used alone or used in admixture of two or more of them.

By applying the negative electrode slurry to the current collector, the negative electrode composition can be held by a negative electrode current collector (second step). A method for applying the negative electrode slurry is not particularly limited. The negative electrode slurry can be applied using, for example, an applicator such as a die coater.

Examples of the negative electrode current collector include, but are not limited to, a metal foil, a non-woven fabric made of metal fiber, a metal porous body, and the like. A metal constituting the negative electrode current collector is preferably copper, a copper alloy, nickel, a nickel alloy, aluminum, an aluminum alloy, or the like, since the metal does not form an alloy with sodium and is stable at a negative electrode electric potential. It is preferable that the copper alloy contains an element other than copper in an amount of less than 50 mass %. It is preferable that the nickel alloy contains an element other than nickel in an amount of less than 50 mass %. It is preferable that the aluminum alloy contains an element other than aluminum in an amount of less than 50 mass %.

When the negative electrode current collector is a metal foil, the metal foil has a thickness of, for example, 10 to 50 μm. When the negative electrode current collector is a non-woven fabric made of metal fiber or a metal porous body, the non-woven fabric made of metal fiber and the metal porous body each have a thickness of, for example, 100 to 1000 μm.

After the second step, at least part of the liquid dispersion medium (first and second dispersion media) is evaporated from the negative electrode slurry held by the negative electrode current collector, thereby giving a negative electrode precursor (third step). In this step, pre-doping with sodium does not usually proceed, and therefore the resulting negative electrode active material layer is in the form of a precursor. The negative electrode composition is deposited on the negative electrode current collector through the third step, which makes it easy to perform subsequent processing.

When the second dispersion medium is completely evaporated, there is a possibility that the metal sodium is brought into a dry state so that a side reaction proceeds. In this case, subsequent processes need to be performed in a reduced-pressure atmosphere or an inert gas atmosphere. From the viewpoint of eliminating such a need, only part of the liquid dispersion medium is preferably evaporated in the third step. Then, the negative electrode current collector for holding the negative electrode composition containing the liquid dispersion medium can be rolled to improve the strength of the negative electrode active material layer precursor.

After the third step, the negative electrode precursor is brought into contact with an electrolyte having sodium ion conductivity, thereby doping the negative electrode active material with a sodium ion eluted from the metal sodium (fourth step). The fourth step can be usually performed in a device case, after the assembly of an electric storage device is almost completed. However, the fourth step can be previously performed before the assembly of an electrode group including a positive electrode, a negative electrode, and a separator interposed between them. For example, a negative electrode is formed from the negative electrode precursor by immersing the negative electrode precursor in an electrolyte having sodium ion conductivity to allow at least part of pre-doping to proceed, thereafter the assembly of an electrode group can be performed by making use of the resulting negative electrode.

In the fourth step, it is preferable that the negative electrode precursor containing no liquid dispersion medium, from the viewpoint of enhancing the efficiency of contact between the negative electrode precursor and the electrolyte. Therefore, when only part of the second dispersion medium is evaporated in the third step, it is preferable that the operation of substantially completely removing the liquid dispersion medium (e.g., drying by heating, drying under reduced pressure, or drying by heating under reduced pressure) is performed just before (e.g., within 10 minutes before) contact between the negative electrode precursor and the electrolyte. Alternatively, in the fourth step, there can be used the negative electrode precursor containing only a minute amount (e.g., an amount corresponding to 0.1 mass % or less of the negative electrode active material contained in the negative electrode precursor) of the remaining liquid dispersion medium. This is because a minute amount of the liquid dispersion medium is easily replaced with the electrolyte by introducing the electrolyte.

The negative electrode preferably has a thickness of 50 to 600 μm. When the negative electrode has a thickness within the above range, pre-doping with sodium is likely to be more uniformly performed. This is because the electrolyte can uniformly penetrate the entire of the negative electrode, including the inside of the negative electrode, and therefore a sodium ion also can be smoothly moved inside the negative electrode.

(Positive Electrode)

The positive electrode includes a positive electrode active material. The positive electrode active material preferably electrochemically occludes and releases a sodium ion. The positive electrode includes a positive electrode current collector and a positive electrode active material fixed to the surface of the positive electrode current collector. The positive electrode can include, as an optional component, a binder, a conductive auxiliary agent, or the like.

Similarly to the negative electrode current collector, examples of the positive electrode current collector include, but are not limited to, a metal foil, a non-woven fabric made of metal fiber, a metal porous sheet, and the like. A metal constituting the positive electrode current collector is not particularly limited, but is preferably aluminum or an aluminum alloy, since the aluminum or aluminum alloy is stable at a positive electrode electric potential. The thickness of the positive electrode current collector can be selected from the same range as that of the negative electrode current collector. As the positive electrode current collector, the metal porous body that has been described above as the negative electrode current collector can also be used.

From the viewpoint of thermal stability and electrochemical stability, there can be preferably used as the positive electrode active material a transition metal compound such as a compound containing a sodium atom and a transition metal atom (e.g., a transition metal atom in the fourth period of the periodic table, such as a chromium atom, a manganese atom, an iron atom, a cobalt atom, or a nickel atom) as a constituent atom; another compound containing the above-described transition metal atom as a constituent atom, or the like. Such a compound can contain one or two or more kinds of transition metal atoms as a constituent atom. The compound can contain at least one of an atom or ion of a typical metal, such as aluminum, replaced with part of at least one of Na and the transition metal in its crystal structure and a lattice defect.

Examples of the transition metal compound include a sulfide an oxide, and the like. Examples of the sulfide include: a transition metal sulfide such as $TiS_2$ or $FeS_2$; a sodium-containing transition metal sulfide such as $NaTiS_2$; and the other transition metal sulfide. Examples of the oxide include a sodium-containing transition metal oxide such as $NaCrO_2$, $NaNi_{0.5}Mn_{0.5}O_2$, $NaMn_{1.5}Ni_{0.5}O_4$, $NaFeO_2$, $NaFe_{x1}(Ni_{0.5}Mn_{0.5})_{1-x1}O_2$ ($0<x1<1$), $Na_{2/3}Fe_{1/3}Mn_{2/3}O_2$, $NaMnO_2$, $NaNiO_2$, $NaCoO_2$, or $Na_{0.44}MnO_2$. These positive electrode active materials can be used alone or used in admixture of two or more of them. Among these transition metal compounds, sodium-containing transition metal compounds, for example, at least one selected from the group consisting of sodium chromite ($NaCrO_2$) and sodium iron manganate ($Na_{2/3}Fe_{1/3}Mn_{2/3}O_2$).

The binder and the conductive auxiliary agent can each be appropriately selected from those exemplified above with reference to the negative electrode. The amount of each of the binder and the conductive auxiliary agent with respect to the amount of the active material can also be appropriately selected from the range exemplified above with reference to the negative electrode.

As in the case of the negative electrode, the positive electrode can be formed by applying, to the surface of a positive electrode current collector, a positive electrode slurry obtained by dispersing a positive electrode active material and a binder and a conductive auxiliary agent, which are used if necessary, in a dispersion medium, drying the positive electrode slurry, and, if necessary, rolling the positive electrode current collector having the positive electrode active material. The dispersion medium can be appropriately selected from those exemplified above with reference to the negative electrode.

(Separator)

The separator plays a role in physically isolating the positive electrode and the negative electrode from each other to prevent an internal short-circuit. The separator is made of a porous material, and pores in the porous material are filled with an electrolyte so that the separator has sodium ion permeability to ensure a battery reaction. As the separator, for example, a microporous film made of a resin or a non-woven fabric can be used. The thickness of the separator is not particularly limited, but can be selected from the range of, for example, about 10 to 300 μm.

(Electrolyte)

The electrolyte having sodium ion conductivity contains at least a sodium salt. As the electrolyte there can be used an ionic liquid containing a sodium salt or an organic solvent in which a sodium salt is dissolved (organic electrolyte). The concentration of the sodium salt contained in the organic electrolyte can be, for example, 0.3 to 3 mol/L.

An anion (first anion) constituting the sodium salt is not particularly limited. Examples of the anion include: an anion of a fluorine-containing acid (e.g., an anion of fluorine-containing phosphoric acid such as a hexafluorophosphate ion ($PF_6^-$); an anion of a fluorine-containing boric acid such as a tetrafluoroborate ion ($BF_4^-$)); an anion of a chlorine-containing acid (e.g., a perchlorate ion ($ClO_4^-$)); an anion of a fluoroalkane sulfonic acid (e.g., a trifluoromethane-sulfonate ion ($CF_3SO_3^-$)); and a bis(sulfonyl)amide anion. The sodium salt can be used alone or used in admixture of two or more kinds of the sodium salts different in the kind of first anion.

The anion of the sodium salt is preferably a fluorine-containing bis(sulfonyl)amide anion. Examples of the fluorine-containing bis(sulfonyl)amide anion include: a bis(fluorosulfonyl)amide anion ($N(SO_2F)_2^-$); a (fluorosulfonyl)(perfluoroalkylsulfonyl)amide anion (e.g., a (fluorosulfonyl)(trifluoromethylsulfonyl)amide anion (($FSO_2$)($CF_3SO_2$)$N^-$)); a bis(perfluoroalkylsulfonyl)amide anion (e.g., a bis(trifluoromethylsulfonyl)amide anion ($N(SO_2CF_3)_2^-$), a bis(pentafluoroethylsulfonyl)amide anion ($N(SO_2C_2F_5)_2^-$)), and the like. The perfluoroalkyl group has, for example, 1 to 4 carbon atoms, preferably 1 to 3 carbon atoms. The sodium salt is particularly preferably sodium bisfluorosulfonylamide ($NaN(SO_2F)_2$).

The ionic liquid can further contain, in addition to a sodium ion (first cation), a second cation. The second cation can be an inorganic cation other than sodium (e.g., a potassium ion, a magnesium ion, a calcium ion, an ammonium cation), but is preferably an organic cation. These second cations can be used alone or used in admixture of two or more of them.

Examples of the organic cation include: a cation derived from an aliphatic amine, an alicyclic amine, or an aromatic amine (e.g., a quaternary ammonium cation); a nitrogen-containing onium cation such as a cation having a nitrogen-containing heterocycle (a cation derived from a cyclic amine); a sulfur-containing onium cation; a phosphorus-containing onium cation, and the like. The second cation is particularly preferably an organic onium cation having a pyrrolidine skeleton or an imidazoline skeleton. When the second cation is an organic cation, it is easy to reduce the melting point of a molten salt electrolyte.

A second anion as a counter anion of the second cation is preferably a bis(sulfonyl)amide anion (particularly, a fluorine-containing bis(sulfonyl)amide anion). Further, 90 mol % or more of the anion constituting the ionic liquid is preferably a fluorine-containing bis(sulfonyl)amide anion.

The mole ratio between sodium ion and organic cation (sodium ion/organic cation) of the ionic liquid is preferably, for example, 1/99 to 60/40, more preferably 5/95 to 50/50.

(Sodium Ion Battery)

Hereinbelow, the structure of a sodium ion battery as one example of the electric storage device will be described.

Figure 1:
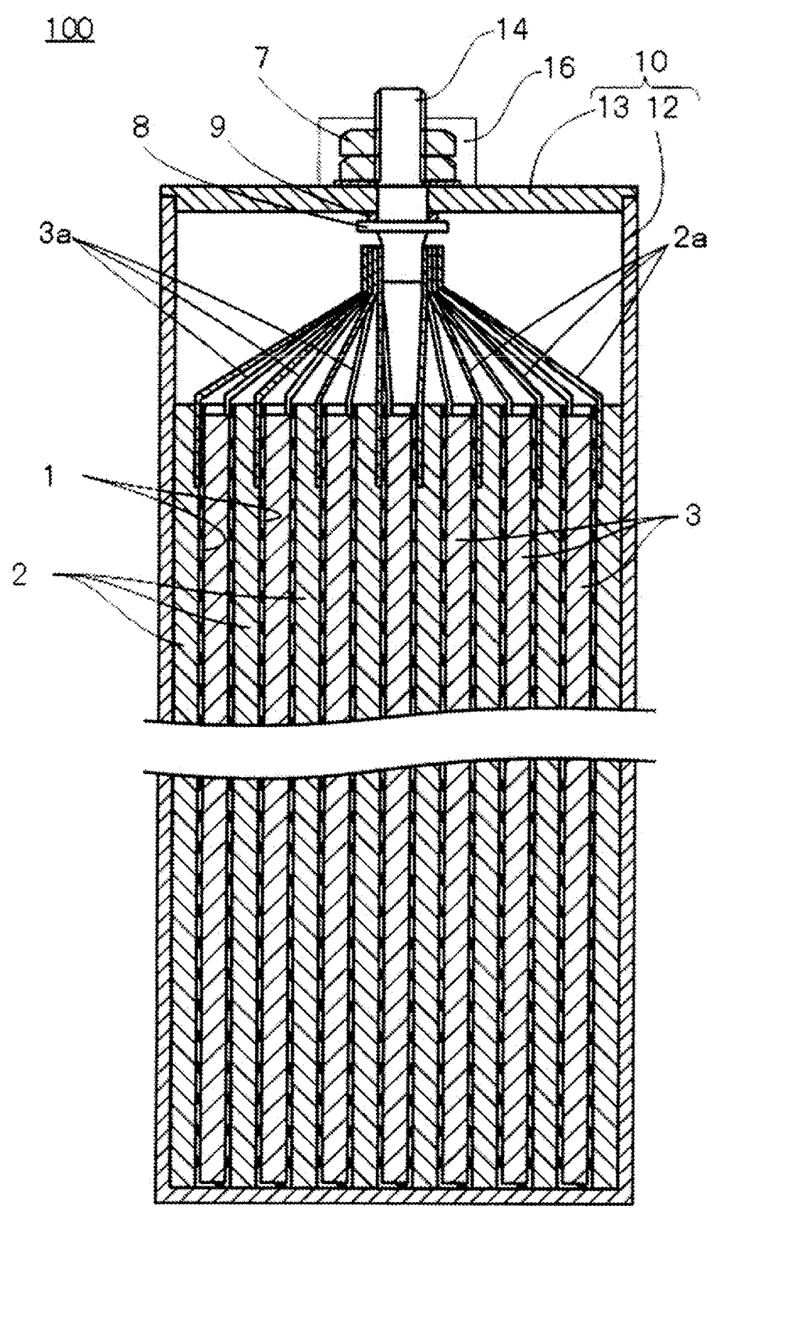
FIG. 1 is a longitudinal sectional view that schematically shows a sodium ion battery according to one embodiment of the present invention.

FIG. 1 is a longitudinal sectional view schematically showing the structure of a sodium ion battery. A sodium ion battery 100 includes a stack-type electrode group, an electrolyte (not shown), and a rectangular aluminum battery case 10 that houses them. The battery case 10 includes a case main body 12 having an upper opening and a closed bottom and a lid 13 that closes the upper opening.

The assembly of the sodium ion battery is performed by first stacking negative electrodes 2 and positive electrodes 3 with separators 1 being interposed between them to form an electrode group. The formed electrode group is inserted into the case main body 12 of the battery case 10. The negative electrodes 2 can be negative electrode precursors containing metal sodium. Alternatively, negative electrodes in which a negative electrode active material has already been pre-doped with sodium can be used. Then, the step of pouring an electrolyte into the case main body 12 is performed to fill gaps between the separators 1 and the negative and positive electrodes 2 and 3 constituting the electrode group with the electrolyte. At this time, a sodium ion is eluted from the metal sodium contained in the negative electrode precursors so that the negative electrode active material is doped with sodium.

In the center of the lid 13, a safety valve 16 is provided to release gas generated inside the battery case 10 when the inner pressure of the battery case 10 is increased. At a position close to one side of the lid 13 having the safety valve 16 in the center thereof, an external negative electrode terminal 14 is provided so as to pass through the lid 13, and at a position close to the other side of the lid 13, an external positive electrode terminal is provided so as to pass through the lid 13.

The stack-type electrode group is constituted from a plurality of the negative electrodes 2 and a plurality of the positive electrodes 3, each of which has a rectangular sheet shape, and a plurality of the separators 1 interposed between them. In FIG. 1, each of the separators 1 is bag-shaped to envelop the positive electrode 3, but the form of the separator is not particularly limited. A plurality of the negative electrodes 2 and a plurality of the positive electrodes 3 are alternately arranged in their stacking direction in the electrode group.

At one end of each of the negative electrodes 2, a negative electrode lead piece 2a can be formed. The negative electrode lead pieces 2a of a plurality of the negative electrodes 2 are tied together and connected to the external negative electrode terminal 14 provided in the lid 13 of the battery case 10 so that a plurality of the negative electrodes 2 are connected in parallel. Similarly, at one end of each of the positive electrodes 3, a positive electrode lead piece 3a can be formed. The positive electrode lead pieces 3a of a plurality of the positive electrodes 3 are tied together and connected to the external positive electrode terminal provided in the lid 13 of the battery case 10 so that a plurality of the positive electrodes 3 are connected in parallel.

Each of the external negative electrode terminal 14 and the external positive electrode terminal is columnar, and has a thread groove in at least a portion exposed to the outside. A nut 7 is engaged with the thread groove of each of the terminals. The nut 7 is fixed to the lid 13 by rotating the nut 7. Each of the terminals has a flange 8 provided in its portion to be housed inside the battery case so that the flange 8 is fixed to the inner surface of the lid 13 via a washer 9 by rotating the nut 7.

Hereinbelow, the present invention will be described based on examples and comparative examples, but is not limited to the following examples.

Example 1

(1) Preparation of Positive Electrode

A positive electrode slurry is prepared by mixing $NaCrO_2$ (positive electrode active material), acetylene black (conductive auxiliary agent), polyvinylidene fluoride (PVDF) (binder) and N-methyl-2-pyrrolidone (NMP) so that a ratio (mass ratio) of positive electrode active material/conductive auxiliary agent/binder was 85/10/5. A disk-shaped positive electrode (diameter: 12 mm, thickness of positive electrode active material layer: 85 μm) was obtained by applying the resulting positive electrode slurry to one of the surfaces of an aluminum foil as a positive electrode current collector, drying the resulting product, compressing dried product, drying in vacuum the compressed product at 150° C., and stamping the dried product into a circular shape. The mass of the positive electrode active material per unit area of the resulting positive electrode was 13.3 mg/cm$^2$.

(2) Preparation of Negative Electrode
(First Step)

Molten metal sodium was solidified in a mold and then taken out of the mold. The resulting solid metal sodium was transferred into a 4N grade nitrogen atmosphere having a dew point of −10° C. or below and an oxygen concentration of 0.01% or less (into a glove box). In the glove box, 10.2 g of the solid metal sodium and 90 g of normal paraffin were put into a four-necked flask. Then, the mixture was stirred while heated to a temperature equal to or higher than the melting point of the metal sodium to disperse the sodium. As a result, a dispersion containing 10 mass % of metal sodium particles was obtained.

The surface of the metal sodium particle was black. The metal sodium particle had an almost spherical shape and an average particle diameter D of 10 μm as measured by a particle size analyzer (SYMPATEC HELOS Laser Diffraction Analyser manufactured by SYMPATEC).

At the same time, 9 g of a polymer containing a styrene unit and a butadiene unit, 90 g of normal paraffin, and 170 g of hard carbon as a negative electrode active material (average particle diameter: 10 μm) were mixed to prepare a negative electrode mixture containing a binder. The dispersion of metal sodium (in an amount corresponding to 100% of the irreversible capacity of the negative electrode active material) and N-methyl-2-pyrrolidone (NMP) as a second dispersion medium were added to and mixed with the negative electrode mixture, thereby giving a negative electrode composition (negative electrode slurry).

(Second Step)

The resulting negative electrode composition was applied to an aluminum foil as a negative electrode current collector.

(Third Step)

The negative electrode composition applied to the negative electrode current collector was dried at 130° C. to evaporate the first dispersion medium and the second dispersion medium. In the negative electrode composition after drying, the first dispersion medium and the second dispersion medium were allowed to remain in a total amount of 0.01 parts by mass per 100 parts by mass of the negative electrode active material. Then, a disk-shaped negative electrode precursor (diameter: 12 mm, thickness of negative electrode active material layer precursor: 70 μm) was obtained by rolling the negative electrode composition, and stamping the resulting product into a circular shape. The mass of the negative electrode active material per unit area of the negative electrode precursor was 5.4 mg/cm$^2$.

(Fourth Step)

A coin-type battery was produced using the resulting positive electrode and the negative electrode precursor. Here, the negative electrode precursor was placed at the inner bottom of a case of a coin-type battery, and a separator was placed on the negative electrode precursor. Then, the positive electrode was placed so as to be opposed to the negative electrode with the separator being interposed between them. Then, an electrolyte was poured into the case, and a lid having an insulating gasket at its edge was fitted to the opening of the battery case to produce a coin-type sodium ion battery (battery A1). As the separator, a microporous film made of a heat-resistant polyolefin (thickness: 50 μm) was used. The ratio of the reversible capacity of the negative electrode ($C_n$) to the reversible capacity of the positive electrode ($C_p$) ($C_n/C_p$) was 1.

After the completion of the battery A1, the battery A1 was allowed to stand at 60° C. for 72 hours. This allowed a sodium ion to elute from the metal sodium into the electrolyte within the battery so that doping of the negative electrode active material with sodium proceeded.

As the electrolyte, a molten salt electrolyte was used which was composed of 100% ionic liquid containing sodium bisfluorosulfonylamide (NaFSA) and 1-methyl-1-propylpyrrolidinium bisfluorosulfonylamide ($P_{13}FSA$) in a mole ratio of 40/60 (NaFSA/$P_{13}FSA$).

Comparative Example 1

A battery B1 was produced in the same manner as in Example 1 except for the following points.
(First Step)
A negative electrode composition (negative electrode slurry) was prepared in the same manner as in Example 1 except that the dispersion of metal sodium was not used.
(Second Step)
The resulting negative electrode composition was applied to an aluminum foil as a negative electrode current collector.
(Third Step)
The negative electrode composition applied to the negative electrode current collector was dried at 130° C. to evaporate the first dispersion medium and the second dispersion medium. From the viewpoint of matching drying conditions, in the negative electrode composition after drying, the first dispersion medium and the second dispersion medium were allowed to remain in a total amount of 0.01 parts by mass per 100 parts by mass of the negative electrode active material. Then, a disk-shaped negative electrode (diameter: 12 mm, thickness of negative electrode active material layer: 70 μm) was obtained by rolling the negative electrode composition, and stamping the resulting product into a circular shape. The mass of the negative electrode active material per unit area of the negative electrode was 5.4 mg/cm$^2$.
(Fourth Step)
A coin-type battery was produced using the resulting positive electrode and the negative electrode precursor. Here, a metal sodium foil having a thickness of 50 μm was attached to the inner bottom of a case of a coin-type battery. Then, the negative electrode was placed on the metal sodium foil, and a separator was placed on the negative electrode. Then, the positive electrode was placed so as to be opposed to the negative electrode with the separator being interposed between them. Then, an electrolyte was poured into the case, and a lid having an insulating gasket at its edge was fitted to the opening of the battery case to produce a coin-type sodium ion battery (battery B1).

After the completion of the battery B1, the battery B1 was allowed to stand at 60° C. for 72 hours. This allowed a sodium ion to elute from the metal sodium foil into the electrolyte within the battery so that doping of the negative electrode active material with sodium proceeded.
[Evaluation]

The sodium ion battery was heated to 60° C., and was subjected to constant-current charge at a current rate of 1 C up to 3.3 V and then subjected to constant-voltage charge at 3.3 V (initial charge). Then, the sodium ion battery was discharged to 1.8 V at a current rate of 1 C (initial discharge) to measure the discharge capacity of the battery during initial discharge (first cycle discharge capacity).

The results of measuring the initial discharge capacity per gram of the positive electrode active material in Example and Comparative Example are shown in Table 1.

TABLE 1

|  | Initial discharge capacity (mAh/g) |
| --- | --- |
| Example 1 | 110 mAh/g |
| Comparative Example 1 | 85 mAh/g |

As shown in Table 1, the initial discharge capacity of Example 1 is larger than that of Comparative Example 1. It is considered that a sufficient utilization rate of the active material was achieved from the initial stage, since the negative electrode active material in the negative electrode was uniformly doped with sodium. Further, the cycle characteristic of Example 1 is superior to that of Comparative Example 1.

INDUSTRIAL APPLICABILITY

The present invention is useful in the field of electric storage devices utilizing a faradaic reaction of a sodium ion, and is particularly suitable for promoting the efficiency of a sodium ion battery production process.

REFERENCE SIGNS LIST

1: SEPARATOR
2: NEGATIVE ELECTRODE
2a: NEGATIVE ELECTRODE LEAD PIECE
3: POSITIVE ELECTRODE
3a: POSITIVE ELECTRODE LEAD PIECE
7: NUT
8: FLANGE
9: WASHER
10: BATTERY CASE
12: CASE MAIN BODY
13: LID
14: EXTERNAL NEGATIVE ELECTRODE TERMINAL
16: SAFETY VALVE
100: SODIUM ION SECONDARY BATTERY

The invention claimed is:

1. A negative electrode composition for an electric storage device comprising:
   a particulate negative electrode active material that reversibly carries a sodium ion;
   a metal sodium particle for pre-doping; and
   a liquid dispersion medium for dispersing the negative electrode active material and the metal sodium particle for pre-doping,
   wherein the particulate negative electrode active material and the metal sodium particle are dispersed throughout the negative electrode composition in a state before doping the particulate negative electrode active material with the metal sodium particle,
   wherein the liquid dispersion medium does not react with metal sodium particle, and
   wherein the negative electrode composition contains the metal sodium particle in an amount corresponding to 10 to 200% of an irreversible capacity of the particulate negative electrode active material.

2. The negative electrode composition for an electric storage device according to claim 1, wherein the metal sodium particle has an average particle diameter D of 10 to 60 μm.

3. The negative electrode composition for an electric storage device according to claim 1, wherein part of the metal sodium in the metal sodium particle is ionized and occluded in the particulate negative electrode active material.

4. A negative electrode for an electric storage device comprising: the negative electrode composition according to claim 3; and a negative electrode current collector for holding the negative electrode composition.

5. An electric storage device comprising: the negative electrode according to claim 4; a positive electrode comprising a positive electrode active material; a separator interposed between the negative electrode and the positive electrode; and an electrolyte having sodium ion conductivity.

6. The electric storage device according to claim 5, wherein the electrolyte comprises an ionic liquid composed of an anion and a cation.

7. The electric storage device according to claim 6, wherein 90 mol % or more of the anion is a fluorine-containing bis(sulfonyl)amide anion.

8. A method for producing a negative electrode for an electric storage device, the method comprising the steps of:
preparing the negative electrode composition of claim 1;
allowing a negative electrode current collector to hold the negative electrode composition;
evaporating at least part of the liquid dispersion medium from the negative electrode composition held by the negative electrode current collector, thereby giving a negative electrode precursor comprising the negative electrode active material, the metal sodium, and the negative electrode current collector; and
bringing the negative electrode precursor into contact with an electrolyte having sodium ion conductivity to ionize the metal sodium, thereby doping the negative electrode active material with sodium.

* * * * *